United States Patent
MacDonald

(10) Patent No.: US 7,406,260 B2
(45) Date of Patent: Jul. 29, 2008

(54) METHOD AND SYSTEM FOR NETWORK WIDE FAULT ISOLATION IN AN OPTICAL NETWORK

(75) Inventor: Roderick William MacDonald, Ontario (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 818 days.

(21) Appl. No.: 10/981,591

(22) Filed: Nov. 5, 2004

(65) Prior Publication Data

US 2005/0099953 A1   May 12, 2005

(51) Int. Cl.
*H04B 10/00* (2006.01)
*H04B 10/08* (2006.01)
*G02F 1/00* (2006.01)

(52) U.S. Cl. .................. 398/1; 398/9; 398/10; 398/17; 370/241

(58) Field of Classification Search ............... 398/1–10, 398/12, 13, 14, 15, 17, 20, 25, 28, 33; 370/241
See application file for complete search history.

(56) References Cited

U.S. PATENT DOCUMENTS

| 5,949,759 | A | 9/1999 | Cretegny et al. |
| 6,006,016 | A | 12/1999 | Faigon et al. |
| 6,253,339 | B1 | 6/2001 | Tse et al. |
| 6,356,885 | B2 | 3/2002 | Ross et al. |
| 6,604,208 | B1 | 8/2003 | Gosselin et al. |
| 6,707,795 | B1 * | 3/2004 | Noorhosseini et al. ...... 370/242 |
| 2004/0120710 | A1 * | 6/2004 | Seddigh et al. ............... 398/33 |

* cited by examiner

*Primary Examiner*—M. R. Sedighian
(74) *Attorney, Agent, or Firm*—Victoria Donnelly

(57) ABSTRACT

A method and system for network wide fault isolation in an optical network are described. A single fault in a network can produce a large number of alarms at different points in an optical network. The described method and system identify the root cause alarm while masking all correlated alarms. In the embodiment of the invention, the method and system are based on a wavelength tracker technology allowing identification and tracking of individual channels in the optical network.

12 Claims, 4 Drawing Sheets

US 7,406,260 B2

METHOD AND SYSTEM FOR NETWORK WIDE FAULT ISOLATION IN AN OPTICAL NETWORK

FIELD OF INVENTION

The invention relates to optical communication systems, and in particular to a method and system for network wide fault isolation in an optical network.

BACKGROUND OF INVENTION

An optical network is subject to intermittent faults that may raise alarms in the system. A single fault in the system can however give rise to multiple alarms detected at multiple points in the network. Finding the root cause alarm corresponding to the fault that has triggered these alarms is important for fault isolation and repair.

In the absence of an automatic fault isolation system, the network operator has to manually go through the list of alarms and identify the root cause alarm triggered by a fault that needs to be alleviated. This can be a long and arduous task in large networks. It cannot only overwhelm even an experienced network operator but can also increase the time for the detection of the failure. This in turn can significantly increase the time required for returning service to the network.

Alarm correlation has been addressed by prior art. U.S. Pat. No. 6,707,795 B1 to Noorhooseini et al. issued Mar. 16, 2004, which describes an alarm correlation method for use in a network management device. Using a hierarchical network model, the method performs a correlation between the root cause alarm and other alarms raised by network elements that satisfy particular relationships with the network element that produced the root cause alarm.

Another method and apparatus for incremental alarm correlation is described in the U.S. Pat. No. 6,604,208 B1 to Gosselin et al. issued Aug. 5, 2003. The method partitions the alarms into correlation sets in such a way that the alarms within a set have a high probability of being caused by the same network fault.

Partitioning of alarms is also performed by an invention described in the U.S. Pat. No. 6,253,339 B1 to Tse et al. issued Jun. 26, 2001. This patent provides a method and system for correlating alarms for a number of network elements. The system uses an alarm correlator that partitions the alarms into correlated alarm clusters. The clusters are constructed in such a way that the alarms in a given cluster have a high probability of being caused by the same network fault.

A method for processing data such as alarms concerns U.S. Pat. No. 6,356,885 B2 to Ross et al. issued Mar. 12, 2002. The method performs alarm correlation for a set of managed units. When one of the managed units is notified of an event such as an alarm, the cause of an alarm is determined by using a virtual model. The model comprises the managed units corresponding to the network entities. Each unit contains information about the services offered and received by its entity to and from other entities. A unit uses its knowledge-based reasoning capacity for adapting the model by using this information.

Yet another method and apparatus for fault correlation in a networking system is described in U.S. Pat. No. 6,006,016 to Faigon et al. issued Dec. 21, 1999. In this patent, occurrences of faults are detected and correlated by using a set of rules that are based on the number of times a specific fault event is generated during a time threshold.

A number of algorithms for alarm correlation and the determination of the possible location of faults in a large communication network is presented in U.S. Pat. No. 5,309,448 to Bouloutas et al. issued May 3, 1994. The techniques described in this patent differ in the degree of accuracy in fault location and in their algorithmic complexity.

Fault correlation in packet switched networks is considered in U.S. Pat. No. 5,949,759 to Cretegny et al. issued Sep. 7, 1999. It describes a method that registers a failure in a high-speed packet switched network such that the failure information can be retrieved by the network management system.

Notification of faults and load balancing of the data traffic among multiple paths in an overlay mesh network is described in U.S. Pat. No. 6,725,401 B1 to Lindhorst-Ko issued Apr. 20, 2004.

The above cited prior art indicates that there have been multiple attempts to solve the problem of identifying faults but there is still a need in the industry for further developments of an efficient method and system for identifying and isolating faults in the network.

SUMMARY OF THE INVENTION

Therefore there is an objective of the invention to provide a system and method for determining a root cause alarm in an optical communication system while suppressing other correlated alarms.

A method for network wide fault isolation in an optical network having Optical Channel (OCh) paths, (each OCh path comprising a sequence of ports), the method comprising the steps of identifying root cause alarms in the optical network; and displaying said root cause alarms. The step of identifying the root cause alarms in the optical network comprises the steps of constructing a list of all affected OCh paths in the optical network and analyzing the OCh paths in said list. The step of analyzing the OCh paths in said list, comprises the steps of masking alarms in the OCh paths in the transmit direction and masking alarms in the OCh paths in the receive direction. The step of masking alarms in the OCh path in the transmit direction comprises the step of analyzing alarms at the ports on the OCh path in the transmit direction. The step of analyzing alarms in the transmit direction comprises the steps of preparing a list of the alarms present at each port on the OCh path in the transmit direction; determining if each alarm in the list is an OCh alarm or a port level alarm or a card level alarm; and masking alarms in the downstream OCh path in the transmit direction that are correlated with each alarm in the list.

For a specific OCh path, OCh alarms can mask OCh alarms, port level alarms can mask port level alarms and OCh alarms and card level alarms can mask port level alarms and OCh alarms. The step of masking alarms in the OCh path in the receive direction comprises the step of analyzing alarms at the ports on the OCh path in the receive direction. The step of analyzing alarms comprises the steps of preparing a list of the alarms present at each port on the OCh path in the receive direction; determining if each alarm in the list is an OCh alarm or a port level alarm or a card level alarm; and masking alarms in the downstream OCh path in the receive direction that are correlated with each alarm in the list. The step of displaying said root cause alarms comprises the step of displaying remaining unmasked alarms.

A method for network wide fault isolation in an optical network with an Element Management System (EMS), wherein the EMS has a view of a network topology and Wavelength Tracker data obtained by using Wavelength Tracker technology, the optical network contains Optical Channel (OCh) paths, each having a unique signature in a form of a low frequency dither tone modulation called Wavekey, generated by Wavelength Tracker, the method comprising the steps of identifying root cause alarms in the optical network and displaying said root cause alarms. The step of identifying the root cause alarms in the optical network with EMS comprises the step of masking non-root cause alarms in the OCh paths in the optical network.

A system for network wide fault isolation in an optical network, wherein the optical network contains OCh paths, (each OCh path comprising a sequence of ports), the system comprising means for identifying root cause alarms in the optical network and a display unit for displaying said root cause alarms. The means for identifying the root cause alarms in the optical network comprises: means for constructing a list of all affected OCh paths in the optical network and means for analyzing the OCh paths in said list. The means for analyzing the OCh paths in said list comprises means for masking alarms in the OCh path in the transmit direction and means for masking alarms in the OCh path in the receive direction. The means for masking alarms in the OCh path in the transmit direction comprises means for analyzing alarms at the ports on the OCh path in the transmit direction. The means for analyzing alarms in the transmit direction comprises: means for preparing a list of the alarms present at each port on the OCh path in the transmit direction; means for determining if each alarm in the list is an OCh alarm or a port level alarm or a card level alarm; and means for masking alarms in the downstream OCh path in the transmit direction that are correlated with each alarm in the list.

In the system, for a specific OCh path, OCh alarms can mask OCh alarms, port level alarms can mask port level alarms and OCh alarms and card level alarms can mask port level alarms and OCh alarms.

The means for masking alarms in the OCh path in the receive direction comprises means for analyzing alarms in each port on the OCh path in the receive direction. The means for analyzing alarms comprises: means for preparing a list of the alarms present at each port on the OCh path in the receive direction; means for determining if each alarm in the list is an OCh alarm or a port level alarm or a card level alarm; and means for masking alarms in the downstream OCh path in the receive direction that are correlated with each alarm in the list.

The display unit for displaying said root cause alarms comprises means for displaying remaining unmasked alarms.

A system for network wide fault isolation in an optical network with an Element Management System (EMS), wherein the EMS has a view of a network topology and Wavelength Tracker data obtained by using Wavelength Tracker technology, and the optical network contains Optical Channel (OCh) paths, each having a unique signature in a form of a low frequency dither tone modulation called Wavekey generated by Wavelength Tracker, the system comprising: means for identifying root cause alarms in the optical network with EMS; and a display unit for displaying said root cause alarms.

The means for identifying root cause alarms in the optical network with EMS comprises means for masking non-root cause alarms in the OCh paths in the optical network.

BRIEF DESCRIPTION OF THE DRAWINGS

Further features and advantages of the invention will be apparent from the following description of the embodiment, which is described by way of example only and with reference to the accompanying drawings in which.

DETAILED DESCRIPTION OF THE EMBODIMENT OF THE INVENTION

Figure 1:
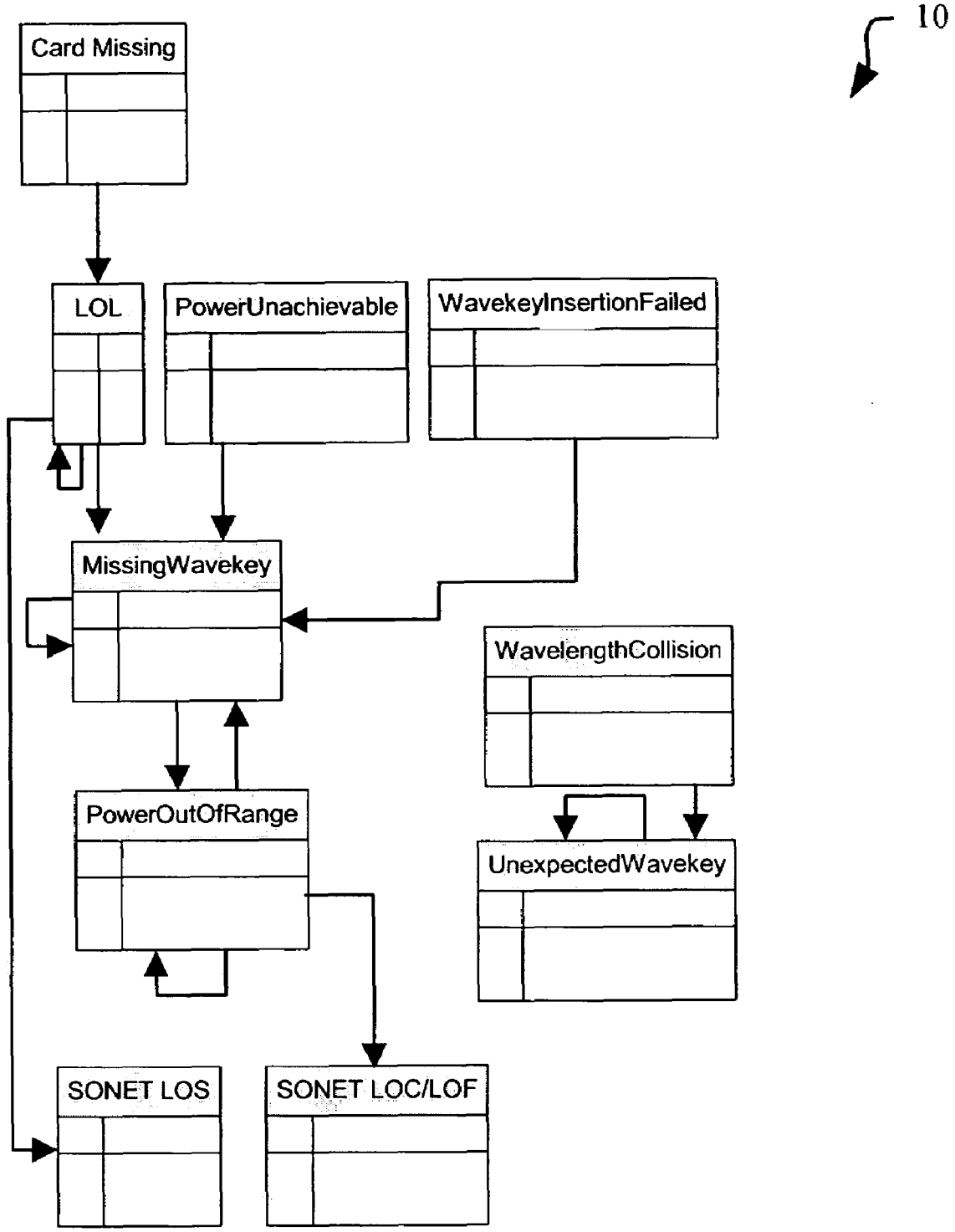
FIG. 1 presents the Entity-Relationship Diagram used in fault correlation.

To provide network wide fault isolation, it is necessary to identify a single point of failure in the network, e.g. based on a number of active alarms, while masking the non-root cause alarms from the operator's view at the Element Management System (EMS). The EMS is the management system for network elements (NEs). The fault isolation system and method according to the embodiment of this invention are focused on the alarms raised at the optical channel (OCh) layer.

Monitoring of faults that give rise to alarms in the OCh layer is achieved by using Tropic Network's Wavelength Tracker Technology. A light path to be monitored on an optical network can be identified by using Wavelength Tracker. The Wavelength Tracker technology applies a unique optical signature to each wavelength (channel) at the Dense Wavelength Division Multiplexing (DWDM) layer. The unique optical signature includes a low frequency modulation of one or more dither tones onto the optical channel, which uniquely identify the optical channel. This optical signature (also called a Wavekey) is applied to the optical channel at the source node of the light path. The optical signature is detectable at intermediate nodes on the light path via inexpensive decoders present on line cards. Detection of the optical signature is accomplished without an Optical-Electrical-Optical (OEO) conversion at intermediate nodes, thus resulting in a cost-effective solution. Wavelength Tracker technology is used for a variety of applications including optical power monitoring and loss of light avoidance. The technology for generating and detecting Wavekeys has been described in U.S. patent application Ser. No. 09/963,501 by Obeda, P. D., et al, entitled "Topology Discovery in Optical WDM Networks", filed on 27 Sep. 2001.

The fault isolation system and method according to the embodiment of this invention are concerned with both light path and protocol related alarms. There are three levels of alarms in the system: OCh, port and card. The light path related category consists of all the three levels of alarms whereas the protocol related alarms are port level alarms. Masking of non-root cause alarms is based on alarm correlation. The alarm correlation service implemented in the embodiment of this invention concentrates on alarms that includes the alarms associated with:

Loss of light and/or optical Loss-Of-Service (LOS)
Missing, unexpected, and insertion of Wavekeys
Power alarms based on Wavekeys
SONET alarms:
   Loss-Of-Service (LOS)
   Loss-Of-Clock (LOC)
   Loss-Of-Frame (LOF)

Due to their nature, unexpected Wavekey alarms will only correlate to themselves along a light path. A Wavekey alarm is an alarm generated using the Wavekey technology. Examples of Wavekey alarms include:

Missing Wavekey—the Wavekey was expected at this detection point but is missing. The presence of this alarm implies that an OCh channel is missing or mis-provisioned.

Unexpected Wavekey—a Wavekey that was not expected has been detected.

Power Out of Range—the power level of an OCh is out of the expected range

Duplicate Wavekey—multiple OChs are using the same Wavekey signature

As correlated alarms (raise/clear) are received by the EMS, the fault system notifies an alarm correlation service of the affected OChs. Periodically, on predetermined intervals, the alarm correlation service will look at any newly affected OCh path and perform an alarm correlation action along the path. As alarms are correlated, the root cause alarm will be given the severity of the highest alarm that it is correlated with. Before describing the method of the embodiment of the invention that concerns this alarm correlation and the displaying of the root cause alarms, masking of correlated alarms is explained.

In general, OCh alarms can mask OCh alarms, port level alarms can mask port level as well as OCh alarms and card level alarms can also mask port level and OCh alarms. There are special cases that are handled by a set of rules. For example, PowerOutOfRange (OCh alarm) may mask a port level alarm if a single light path is present. Another example concerns the LOS alarm. If an LOS alarm is raised, the corresponding light path is walked and LOS alarms are masked on the way until the light path crosses a card. If the card does not add light then the LOS alarms are masked as the walk continues. If the card does add light then LOS alarm is not masked.

A specific alarm (OCh or port level or card level) can mask one or more alarms. The information regarding which alarms are masked by a given alarm is captured in an alarm masking hierarchy presented in the Entity-Relationship diagram of FIG. 1. The FIG. 1 displays the alarm masking hierarchy used in alarm correlation. Each box is labeled with a specific alarm, and the arrows indicate a "masks" relationship. The entity at the head of the arrow is masked by the entity at the tail of the arrow. For example, the Loss-Of-Light (LOL) alarm on an OCh path masks any Missing Wavekey alarm. The masks relationship is transitive. Thus if a masks b and b masks c then a will mask c. For example a LOL will mask a PowerOutOfRange. It is to be noted that an alarm can mask another alarm of the same class. For example, an alarm in the Missing-Wavekey or the PowerOutOfRange class will mask other alarms in the MissingWavekey or PowerOutOfRangle class respectively. This is captured by using the same entity at the head and tail of an arrow. Note that an alarm b can be masking alarm c while it can be masked by another higher-level alarm a in the hierarchy presented in the Entity-Relationship diagram.

The unique optical monitoring capabilities of Wavelength Tracker allows for fault/power monitoring in multiple detection points along a path spanning multiple network elements (NEs) such as switch nodes, service nodes, cross connects or the like. A failure at the fiber, card, port or wavelength level (for example, cut, dirty, bend, misfibering) can cause multiple downstream alarms to appear at multiple NEs. Thus at the EMS, a number of NEs may appear to have active alarms.

The EMS in an optical network has a unique view of the network topology and Wavelength Tracker data that allows to explicitly relating alarms to a specific wavelength on a specific fiber. The wavelength identification allows for deterministic and accurate fault isolation. The EMS view makes it possible to make a connection between OCh channels and the fibers, card, and ports they pass through. The channel view allows the propagation of fault analysis from the Synchronous Optical Network (SONET) layer to the OCh layer and then up to the equipment layer.

Since the EMS has access to topology information (and is aware of the changes in topology), fault isolation of the embodiment of the invention is triggered based on topology changes and not just the raising and clearing of faults. In addition, the fault isolation is not necessarily service based. That is, a higher-level circuit (i.e. SONET Trail) does not have to be defined to allow the fault isolation mechanism to traverse the OCh topology.

Figure 2:
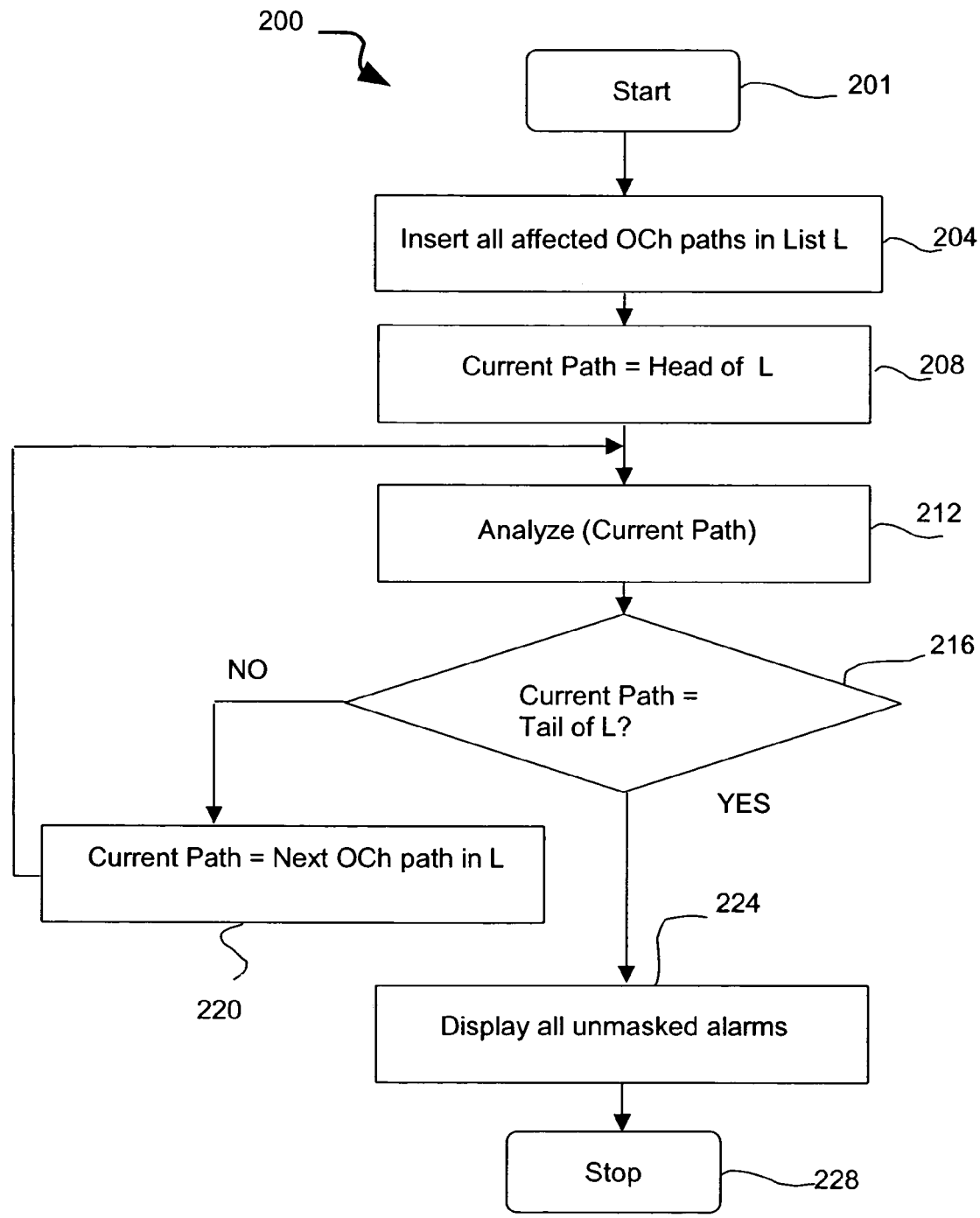
FIG. 2 shows a flowchart that illustrates the steps of the method for network wide fault isolation in an optical network.

The embodiment of the invention identifies the root cause alarms and subsequent correlated alarms that are masked from the normal fault view. The method for network wide fault isolation in an optical network that identifies root cause alarms and the masking of other correlated alarms are explained with the help of the flowchart presented in FIG. 2. Upon start (box 201) the method generates a list L containing all the affected OCh paths (box 204). Current Path is set to be the path at the head of the list L (box 208). The alarms in this path are processed by calling a procedure called Analyze on Current Path (box 212). After the procedure Analyze 212 returns, the value of Current Path is checked (box 216). If Current Path is the path at the tail of list L, it means that the entire list has been searched and the procedure exits YES from box 216. All the alarms that remain unmasked at this stage are the root cause alarms and are displayed (box 224). The procedure terminates at box 228. If Current Path is not the path at the tail of list L (box 216), the procedure exits NO from box 216. Current Path is set equal to the next path in L (box 220), and the procedure loops back to the entry of step 212 to analyze the alarms in this path.

Figure 3:
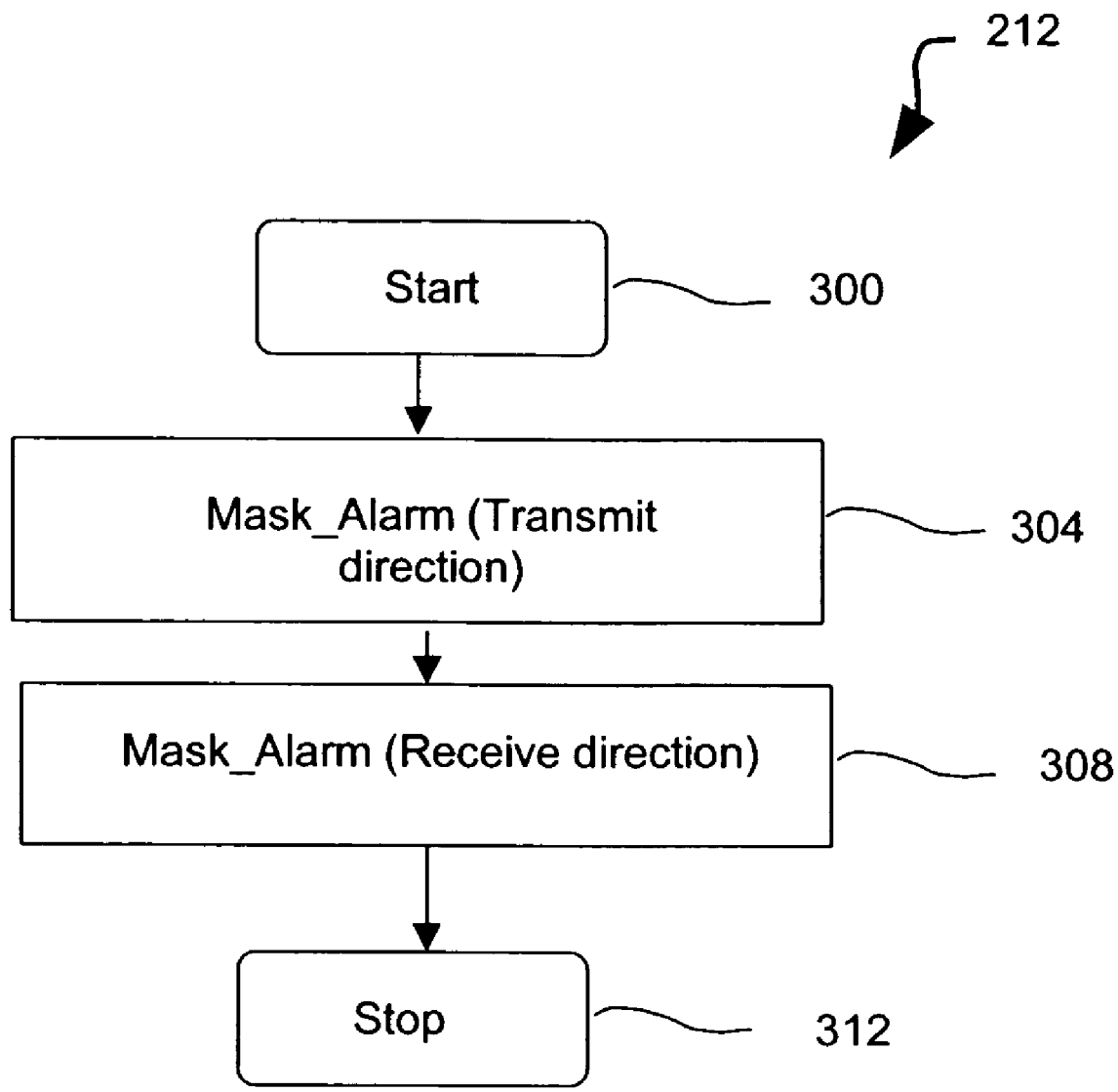
FIG. 3 shows a flowchart that illustrates the step Analyze (212) of the method of FIG. 2 in more detail.

Procedure Analyze 212 is explained in more detail with the help of the flowchart presented in FIG. 3. An OCh path is associated with a path in the transmit direction and a separate path in the receive direction. Upon start (box 300) the procedure Analyze calls the procedure Mask_Alarm in the transmit direction first (box 304), and in the receive direction next (box 308). When the last call to Analyze is complete, the procedure terminates (box 312). Mask_Alarm (box 304 or 308) masks all correlated non-root cause alarms in a given path and is explained in more detail in the next paragraph and with reference to FIG. 4.

Figure 4:
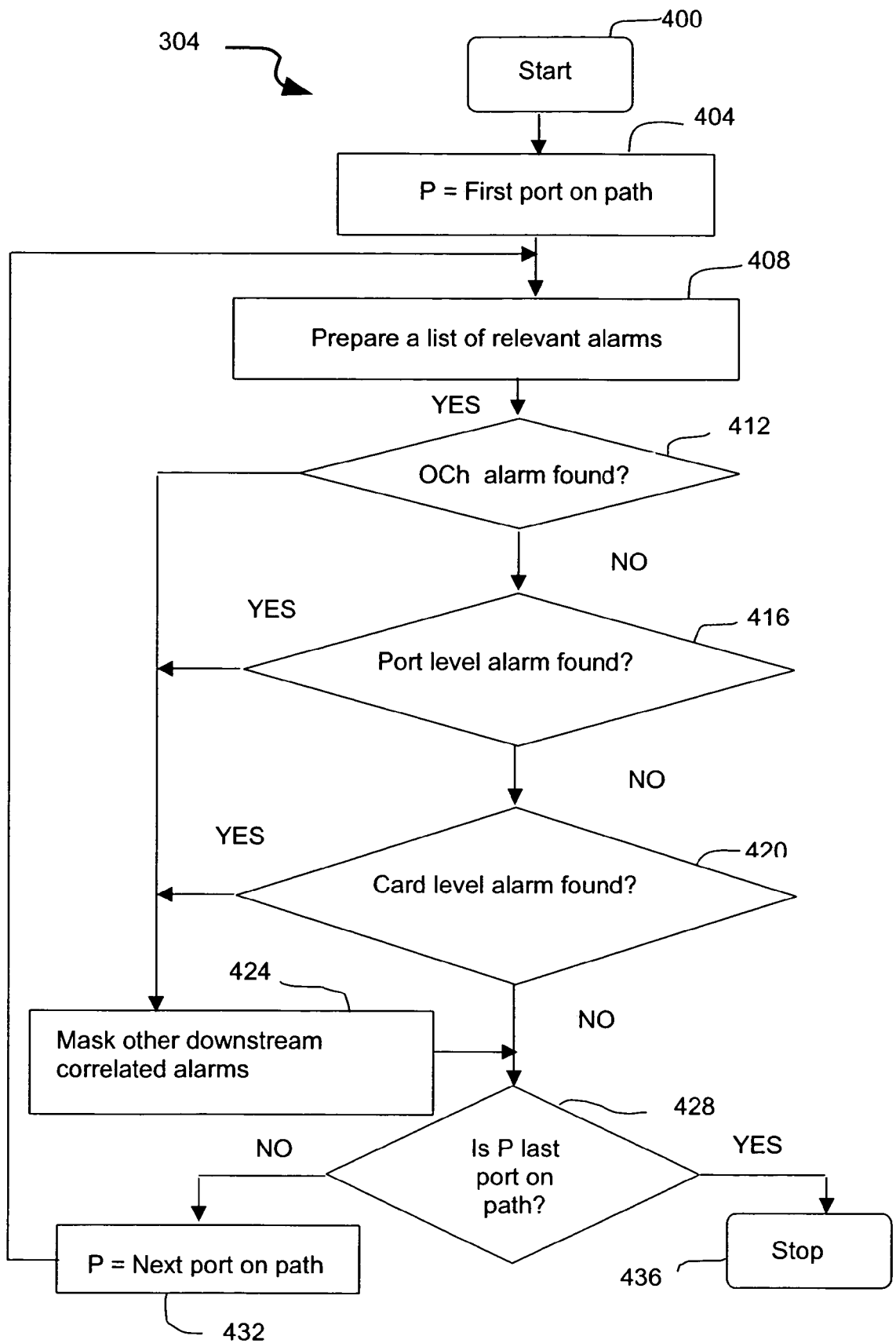
FIG. 4 shows a flowchart that illustrates the steps of Mask_Alarm used in the steps 304 and 308 of FIG. 3 in more detail.

The flowchart presented in FIG. 4 expands the steps underlying the procedure Mask_Alarm used in the steps 304 or 308 of FIG. 3 above. By a way of example, we will refer to the Mask_Alarm in the Transmit direction (box 304), although it is understood that same steps to be performed in the Mask_Alarm in the Receive direction (box 308). Path, the parameter for the procedure is characterized by a sequence of ports that are processed in sequence. Upon start (box 400) the procedure called Mask_Alarm sets P equal to the first port on the path (box 404). A list of relevant alarms is then gathered at P (box 408) and checked (box 412). If no OCh alarm is found, the procedure exits NO from box 412 and checks for the existence of a port level alarm (box 416). If an OCh alarm is found, the procedure exits YES from box 412. If no port level alarm is found in box 416, the procedure exits NO from box 416 and checks if there is any card level alarm (box 420). If a port level alarm is found, the procedure exits YES from box 416. If no card level alarm is present, the procedure exits NO from box 420. If the procedure exits YES from box 412 or box 416 or box 420, the type of the alarm is looked up in the Entity-Relationship diagram (see FIG. 1). If there are other downstream alarms on the path in the given direction that is correlated with this alarm, the downstream alarms are masked (box 424). The procedure then enters box 428. If the procedure had exited NO from box 420, it enters box 428 as well. The procedure then checks if P is the last port in the path (box 428). If P is not the last port on the path, the procedure exits NO from box 428. P is set to the next port on the path (box 432), and the procedure loops back to the entry of box 408, and the alarms on this next port on the path are gathered for processing. If P is the last port on the path, the procedure exits YES from box 428. Processing is now complete and the procedure terminates (box 436).

The system used in the embodiment of this invention includes a general-purpose computer and hardware interfaces for inputting data related to faults and alarms. The computer has a memory for storing the program that performs the steps of the method for network wide fault isolation. Alternatively, the system may be implemented as a specialized computer programmed to execute the method of the embodiment of the invention, or as a firmware or hardware, which is designed, to perform the steps of the method described above.

Numerous modifications and variations of the present invention are possible in light of the above teachings. For example, various other types of faults with different "masks" relationships can be handled by using an Entity-Relationship diagram that appropriately characterizes the inter-relationship of these faults. Although the embodiment of the invention described applies to optical networks and Wavelength tracker, we believe that the general methodology for fault isolation described can be extended to wireline and wireless networks as well. It is therefore to be understood that within the scope of the appended claims, the invention may be practiced otherwise than as specifically described herein.

What is claimed is:

1. A method for network wide fault isolation in an optical network having Optical Channel (OCh) paths, OCh path comprising a sequence of ports, the method me the steps of:
 identifying root cause alarms in the optical network; and
 displaying said root cause alarms;
wherein the step of identifying the root cause alarms in the optical network comprises the steps of:
 constructing a list of all affected OCh paths in the optical network; and
 analyzing the OCh paths in said list;
wherein the step of analyzing the OCh paths in said list, comprises the steps of:
 masking alarms in the OCh paths in transmit direction; and
 masking alarms in the OCh paths in receive direction;
wherein the step of analyzing alarms comprises the steps of:
preparing a list of the alarms present at each port on the OCh path in the transmit direction;
determining if each alarm in the list is an OCh alarm or a port level alarm or a card level alarm; and
masking alarms in the downstream OCh path in the transmit direction that are correlated with each alarm in the list.

2. A method as claimed in claim 1, wherein for a specific OCh path, OCh alarms can mask OCh alarms, port level alarms can mask port level alarms and OCh alarms and card level alarms can mask port level alarms and OCh alarms.

3. A method as claimed in claim 1 wherein the step of masking alarms in the OCh path in the receive direction comprises the step of analyzing alarms at the ports on the OCh path in the receive direction.

4. A method as claimed in claim 3, wherein the step of analyzing alarms comprises the steps of:
preparing a list of the alarms present at each port on the OCh path in the receive direction;
determining if each alarm in the list is an OCh alarm or a port level alarm or a card level alarm; and
masking alarms in the downstream OCh path in the receive direction that are correlated with each alarm in the list.

5. A method as claimed in claim 4, wherein for a specific OCh path, OCh alarms can mask OCh alarms, port level alarms can mask port level alarms and OCh alarms and card level alarms can mask port level alarms and OCh alarms.

6. A method as claimed in claim 1, wherein the step of displaying said root cause alarms comprises the step of displaying remaining unmasked alarms.

7. A system for network wide fault isolation in an optical network, wherein
the optical network contains OCh paths, each OCh path comprising a sequence of ports, the system comprising:
 means for identifying root cause alarms in the optical network; and
 a display unit for displaying said root cause alarms;
wherein the means for identifying the root cause alarms in the optical network comprises:
 means for constructing a list of all affected OCh paths in the optical network; and
 means for analyzing the OCh paths in said list;
wherein the means for analyzing, the OCh paths in said list comprises:
 means for masking alarms in the OCh path in transmit direction; and
 means for masking alarms the in OCh path in receive direction;
herein the means for masking alarms in the OCh path in the transmit direction comprises means for analyzing alarms at the ports on the OCh path in the transmit direction; and
wherein the means for analyzing alarms in the transmit direction comprises:
 means for preparing a list of the alarms present at each port on the OCh path in the transmit direction;
means for determining if each alarm in the list is an OCh alarm or a port level alarm or a card level alarm; and
means for masking alarms in the downstream OCh path in the transmit direction that are correlated with each alarm in the list.

8. A system as claimed in claim 7, wherein for a specific OCh path, OCh alarms can mask OCh alarms, port level alarms can mask port level alarms and OCh alarms and card level alarms can mask port level alarms and OCh alarms.

9. A system as claimed in claim 7, wherein the means for masking alarms in the OCh path in the receive direction comprises means for analyzing alarms in each port on the OCh path in the receive direction.

10. A system as claimed in claim 9, wherein the means for analyzing alarms comprises:
means for preparing a list of the alarms present at each port on the OCh path in the receive direction;
means for determining if each alarm in the list is an OCh alarm or a port level alarm or a card level alarm; and
means for masking alarms in the downstream OCh path in the receive direction that are correlated with each alarm in the list.

11. A system as claimed in claim 10, wherein for a specific OCh path, OCh alarms can mask OCh alarms, port level alarms can mask port level alarms and OCh alarms and card level alarms can mask port level alarms and OCh alarms.

12. A system as claimed in claim 7, wherein the display unit for displaying said root cause alarms comprises means for displaying remaining unmasked alarms.

* * * * *

UNITED STATES PATENT AND TRADEMARK OFFICE
CERTIFICATE OF CORRECTION

PATENT NO. : 7,406,260 B2
APPLICATION NO. : 10/981591
DATED : July 29, 2008
INVENTOR(S) : R. W. MacDonald It is certified that error appears in the above-identified patent and that said Letters Patent is hereby corrected as shown below:

Column 7, line 36, "me" should be changed to --comprising--
Column 7, line 59, "claim 1" should be changed to --claim 1,--
Column 8, line 24, "analyzing," should be changed to --analyzing--
Column 8, line 28, "alarm the in" should be changed to --alarm in the--
Column 8, line 30, "herein" should be changed to --wherein--

Signed and Sealed this

Sixteenth Day of December, 2008

JON W. DUDAS
*Director of the United States Patent and Trademark Office*